United States Patent [19]
Boring et al.

[11] Patent Number: 5,947,262
[45] Date of Patent: Sep. 7, 1999

[54] CONVEYOR WITH INTEGRATED SELF-ACTUATING CLAMP

[75] Inventors: David E. Boring, East Berlin; Mark D. Van Dyke, Hanover, both of Pa.

[73] Assignee: SER-TEK Systems, Inc., Hanover, Pa.

[21] Appl. No.: 09/211,044

[22] Filed: Dec. 15, 1998

Related U.S. Application Data

[63] Continuation-in-part of application No. 08/855,397, May 13, 1997, abandoned.

[51] Int. Cl.$^6$ .................................................. B65G 25/00
[52] U.S. Cl. ..................................... 198/803.1; 198/803.3; 198/803.7
[58] Field of Search ............................ 198/803.1, 803.7, 198/803.3, 470.1, 817, 604, 606, 803.9

[56] References Cited

U.S. PATENT DOCUMENTS

| | | | |
|---|---|---|---|
| 958,252 | 5/1910 | Jenkins | 198/803.1 |
| 2,783,869 | 3/1957 | Thurman | 198/803.7 |
| 3,125,369 | 3/1964 | Copping | 198/803.7 |
| 3,809,210 | 5/1974 | Anderson | 198/817 |
| 4,276,978 | 7/1981 | Deguchi et al. | 198/817 |
| 4,516,675 | 5/1985 | Koskovich | 198/803.1 |
| 4,654,227 | 3/1987 | Cornellier | 427/96 |
| 5,586,642 | 12/1996 | Hawkins | 198/803.11 |
| 5,765,677 | 6/1998 | Ghini et al. | 198/803.7 |
| 5,845,763 | 12/1998 | Vantilburg | 198/817 |

*Primary Examiner*—William E. Terrell
*Assistant Examiner*—Khoi H. Tran
*Attorney, Agent, or Firm*—Armstrong, Westerman, Hattori, McLeland & Naughton

[57] ABSTRACT

A conveyor assembly includes an endless belt comprised of links which are driven by spaced sprockets. The conveyor carries a plurality of longitudinally spaced pairs of clamping members. The clamping members in each pair are relatively laterally displaceable between a gripping position, at which at least one of the clamping members moves toward the other to cooperatively grip an article for securing it to the conveyor, and a release position at which the at least one clamping member moves apart from the other clamping member to release the gripped article. An operator mechanism associated with each laterally movable clamping member is operative to automatically move the associated clamping member to a clamping position or to a release position in accordance with the direction of displacing movement of the conveyor links with respect to a predetermined attitude. In an alternative embodiment of the invention the clamping members are mounted on flights carried by the links of a roller chain and each clamping member is moved to its clamping position or release position in accordance with the relative displacement occurring between adjacent flights as the roller chain links, which carry the flights, are mutually displaced in traversing a chain drive sprocket.

29 Claims, 11 Drawing Sheets

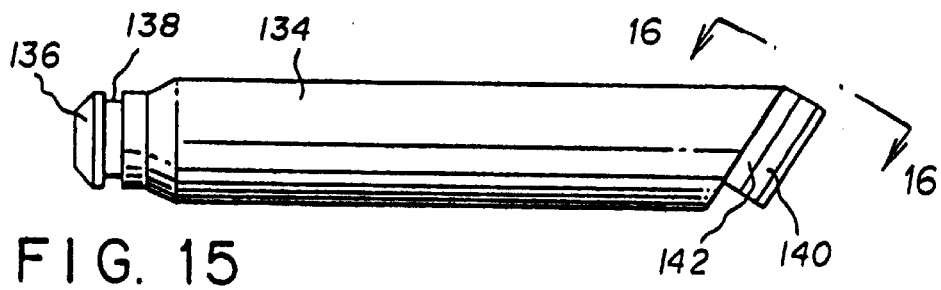
FIG. 15
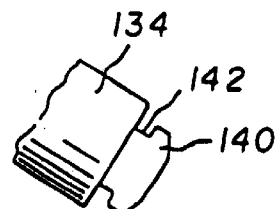
FIG. 17
FIG. 16
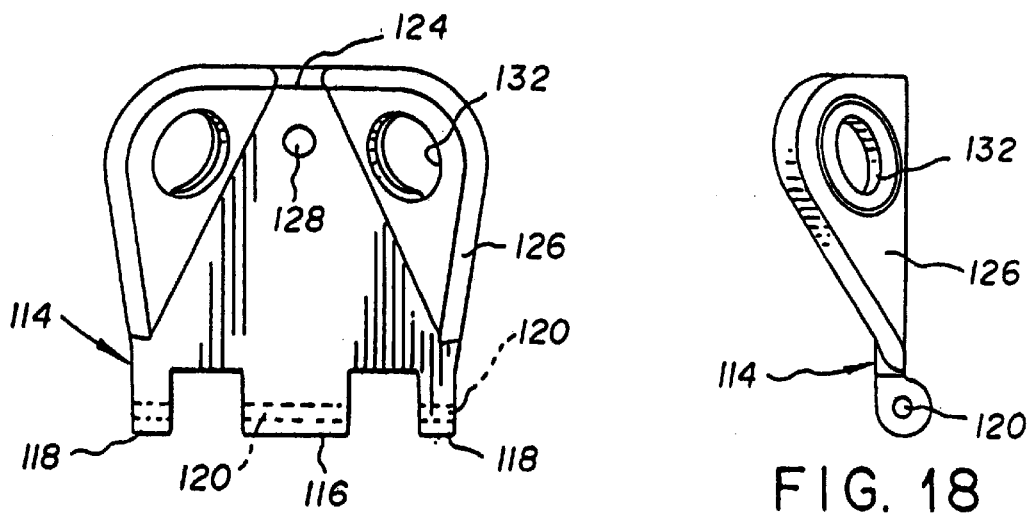
FIG. 18
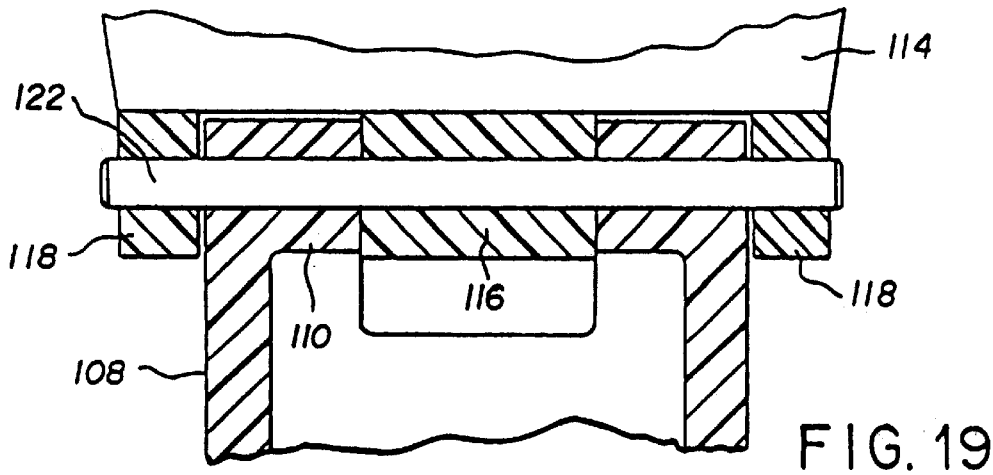
FIG. 19

CONVEYOR WITH INTEGRATED SELF-ACTUATING CLAMP

This application is a Continuation-In-Part of U.S. patent application Ser. No. 08/855,397, filed May 13, 1997, abandoned.

FIELD OF THE INVENTION

This invention relates to endless belt type conveyors. More particularly, the invention involves an endless belt type conveyor having an article-clamping mechanism which is integral with the conveyor and automatically actuated to a clamping condition and to a release condition by movement of the conveyor.

BACKGROUND OF THE INVENTION

Installations exist in which articles, such as packaging containers, or the like, are deposited on a sprocket-driven conveyor belt for transfer from one work station to another. Typically, the articles can be simply manually deposited on the conveyor and conducted thereby to the succeeding work station where the article is either manually removed from the conveyor or alternatively, is discharged into a collection bin or onto a cooperating intersecting conveyor. In those installations in which it is necessary to maintain the article in a stable position, as for example, if the conveyed article has loose or position-sensitive contents, it is necessary that the conveyor be operated only at a slow speed so as to prevent displacement of the articles placed thereon. This problem creates a distinct disadvantage in that work speed in the concerned installation is of necessity retarded, sometimes adversely affecting the production rate of an entire manufacturing facility.

It is to the amelioration of this problem, therefore, to which the present invention is directed.

SUMMARY OF THE INVENTION

The present invention, according to one preferred aspect, provides a conveyor assembly comprising an endless chain structure including longitudinally spaced, articulating links, means for driving the chain structure along a continuous path of movement, the chain structure containing transversely opposed clamping members which are mutually oppositely displaceable between a clamping position in which the clamping members are effective to grippingly secure an article to the chain structure and a release position in which the clamping members release the secured article from the chain structure, and means forming an actuating mechanism associated with each clamping member operative by displacement of the chain structure from a selected course of movement and effective to move the associated clamping member to its clamping position or to its release position in response to the direction of displacement of the adjacent chain structure, and means for displacing the chain structure from the selected course of movement. In the described organization the opposed clamping members, which each comprise a pivot plate that may mount a resilient pad in order to facilitate gripping of the retained article, are each pivotally connected to a pivot base link on the conveyor. An actuating device in the form of an operator element is pivotally connected between the pivot plate and an operator base plate integral with the conveyor structure. The cooperative arrangement of the operator plate and the pivot plate is such that, when the links forming the conveyor are displaced from a coplanar attitude, as for example, when the links traverse a sprocket at the respective ends of the conveyor, or an idler pulley, or the like, disposed intermediate the conveyor ends, the operator elements of a pair of cooperating clamping members are actuated to urge the respective pivot plates with respect to each other to either a gripping position or to a release position, depending upon the direction of displacement of the belt from its selected attitude.

According to another aspect of the invention, a clamping member, as hereinabove described, can be made to operate in association with a fixed cooperating member, or anvil, wherein the clamping function is achieved by moving the single clamping member with respect to the fixed anvil.

According to still another preferred aspect of the invention the conveyor assembly may comprise an endless chain structure including a pair of opposed, transversely spaced chains containing interconnected, articulating roller links. A plurality of flights are attached to the chain in side-by-side relation to be carried thereby, and a pivot plate is connected to selected flights for pivotal movement transversely of the direction of movement of the chain. A clamping member is fixed to the pivot plate and is operative to secure an article when displaced transversely by the pivot plates. An operator member is provided having one end connected to an operator base flight adjacent to the selected pivot base flight and its other end connected to the pivot plate.

A plurality of longitudinally spaced sprockets drive the chain, and about the sprockets the flights angularly deflect with respect to each other as links thereof traverse the sprockets, whereby each operating member is operative to pivotally urge the pivot plate carried by the adjacent pivot base flight transversely of the chain structure as the flights angularly deflect as they traverse the sprockets. Thus, the clamping members are moved to their clamping position or to their release position in response to the direction of relative deflection of the links as they traverse the respective sprockets.

According to a preferred form of the invention, the operator members are preferably formed of resilient material enabling them to deflect axially. Also, the course traversed by the endless chain structure is preferably defined by a frame for mounting the conveyor assembly and includes guide tracks for conducting the flights, which guide tracks are mounted on side rails that enclose the respective sides of each chain structure.

It is, accordingly, an objective of the invention to provide an improved conveyor organization for retaining articles in a stable position during transport.

It is also an objective of the invention to provide an improved conveyor organization which is capable of automatically grasping and releasing articles to be retained thereon for transport without the need of external control devices.

It is a further objective of the invention to provide an improved conveyor organization which is characterized by a simplicity of design and effectiveness of operation to stabilize articles during transport on a conveyor.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 15 is an elevational view of an operator member;

FIG. 16 is a partial view taken along line 16—16 of FIG. 15;

FIGS. 17 and 18 are front and side views, respectively, of a pivot plate according to the invention;

FIG. 19 is a partial view showing the pivoted connection of a pivot plate with a flight according to the invention.

DESCRIPTION OF PREFERRED EMBODIMENTS OF THE INVENTION

Figure 1:
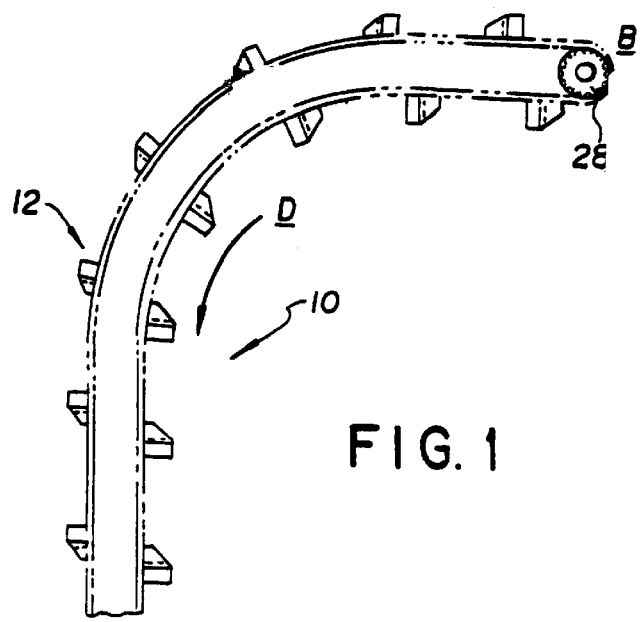
FIG. 1 is a side elevational view illustrating a link-type endless conveyor incorporating clamping members according to the present invention.
Figure 5:
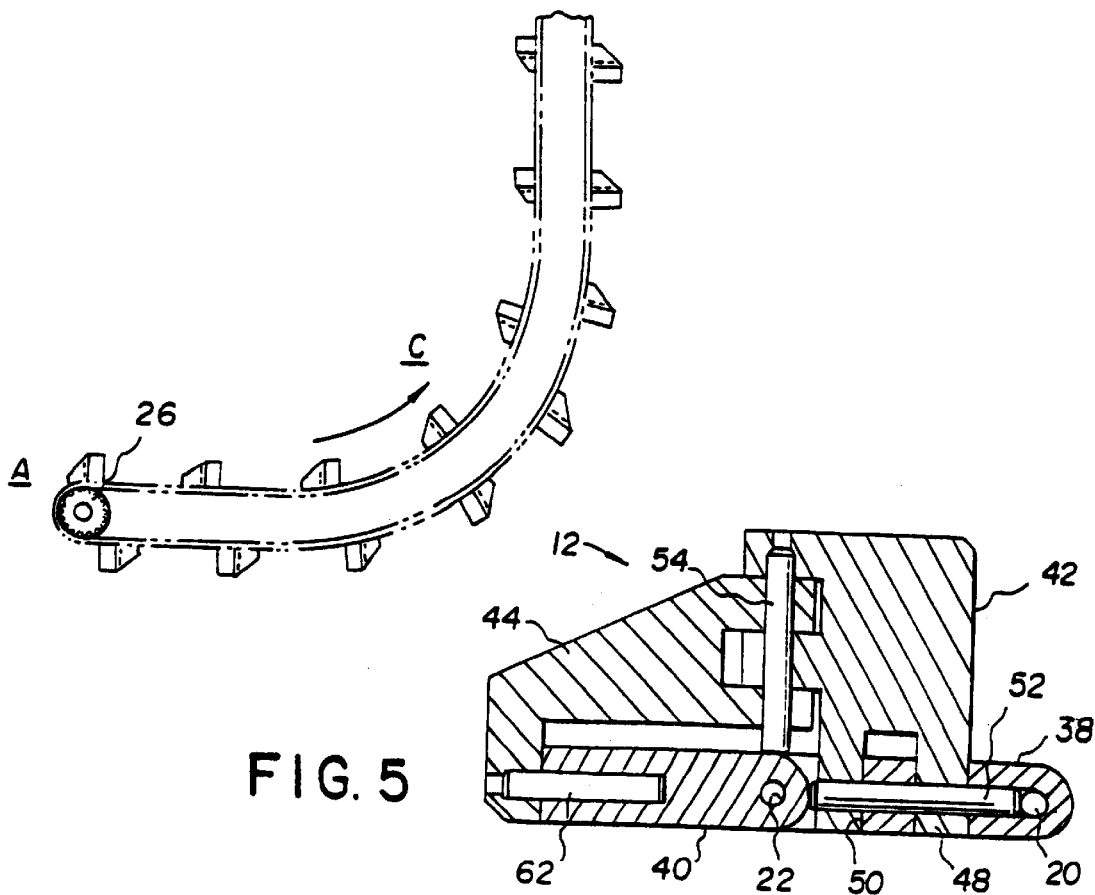
FIG. 5 is a sectional view of the clamping member of the present invention taken along lines 5—5 of FIG. 4.
Figure 2:
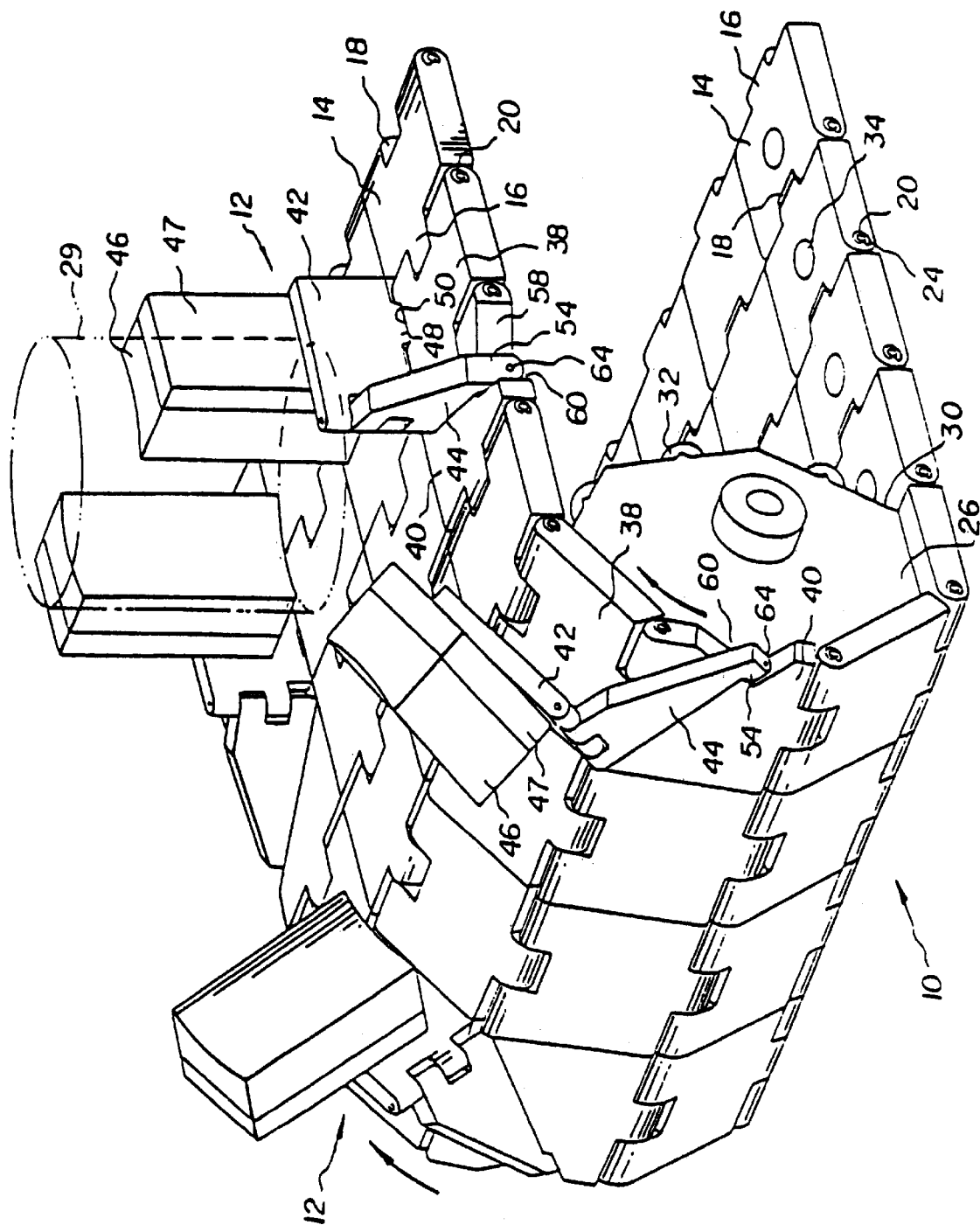
FIG. 2 is an enlarged perspective view illustrating one end portion of the conveyor illustrated in FIG. 1.

With particular reference to FIG. 1 of the drawings, there is shown an endless chain conveyor 10 which incorporates clamping members 12 according to the present invention that are both movable with respect to each other. As best shown in FIG. 2, the conveyor 10 comprises an endless chain structure containing parallel rows of links 14 in the form of flat bodies, each having a tongue 16 and longitudinally aligned groove 18. The links 14 are interconnected by connecting pins 20 which extend laterally across the conveyor through holes 22 that extend transversely through the tongue 16 at one end of each link and through those portions of the link that straddle the groove 18 on the end of the link opposite the tongue. The pins 20 are retained in the structure by split ring washers 24 that may be provided on one end of a headed pin or at both ends of a non-headed pin.

The conveyor may be arranged via appropriate guide structure (not shown) to extend along a predetermined course between spaced sprockets 26 and 28, each being of polygonal peripheral configuration in which each side 30 has a boss-like projection 32 for reception in recesses 34 formed on the back side of the links 14 in order to drive the conveyor 10. In the described organization the conveyor 10 forms an elevator arranged to extend along an essentially S-shaped course whereby articles 29, as for example, cylindrical cans, or the like, shown in phantom in FIG. 2, are positioned, either manually or by cooperating conveying structure (not shown) for grasping by the clamping members 12, as hereinafter described. In the described organization the articles 29 are supplied to the conveyor 10 at point A adjacent the lower sprocket 26 and conducted to a discharge position at point B adjacent the upper sprocket 28 where the articles are released from the clamping members 12 into a receptacle or onto a cooperating conveyor, or the like, none of which is particularly germaine to the present invention and, accordingly, is not shown in the drawings.

Figure 3:
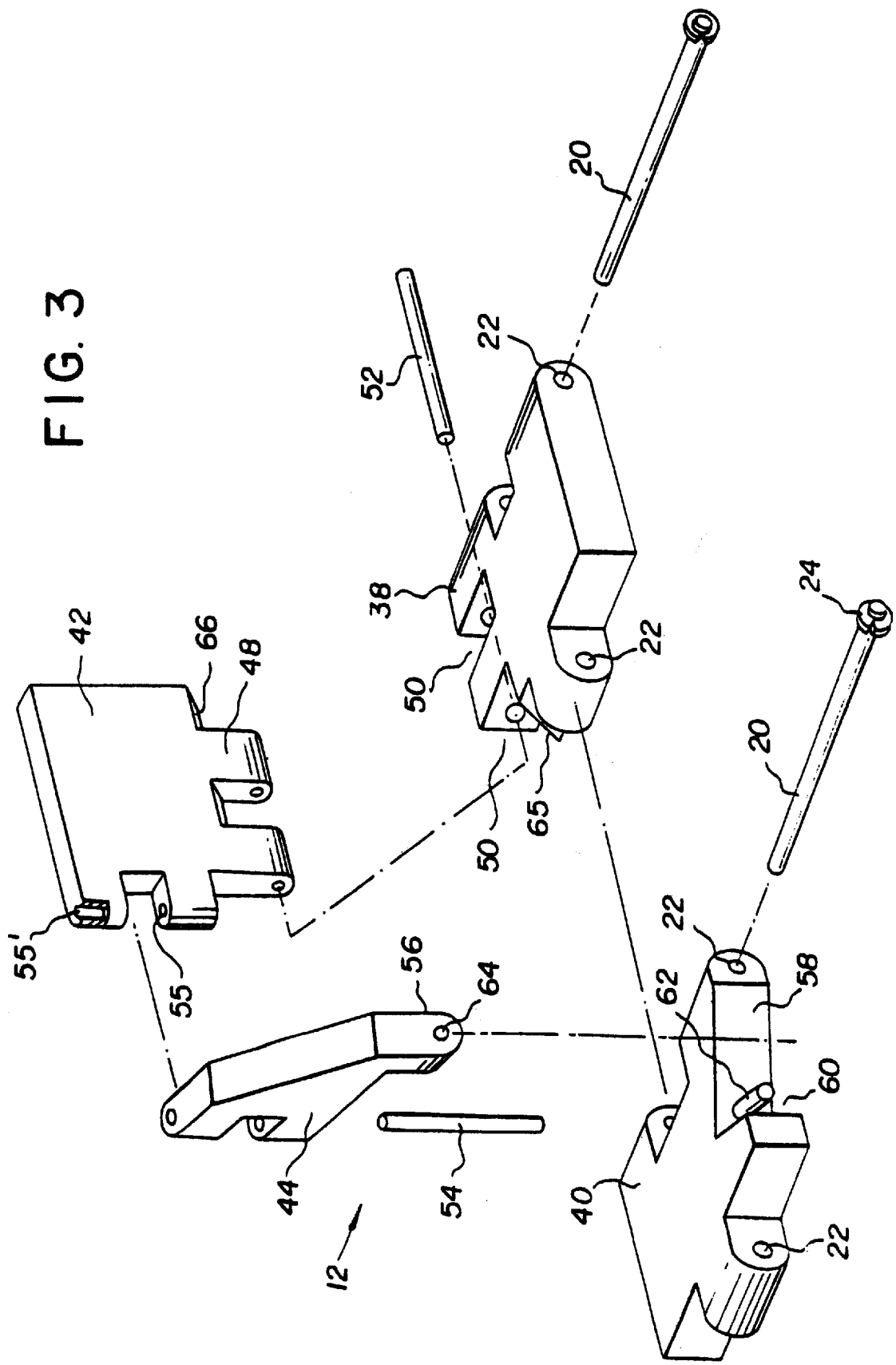
FIG. 3 is an exploded view of the parts constituting a clamping member of the present invention.
Figure 4:
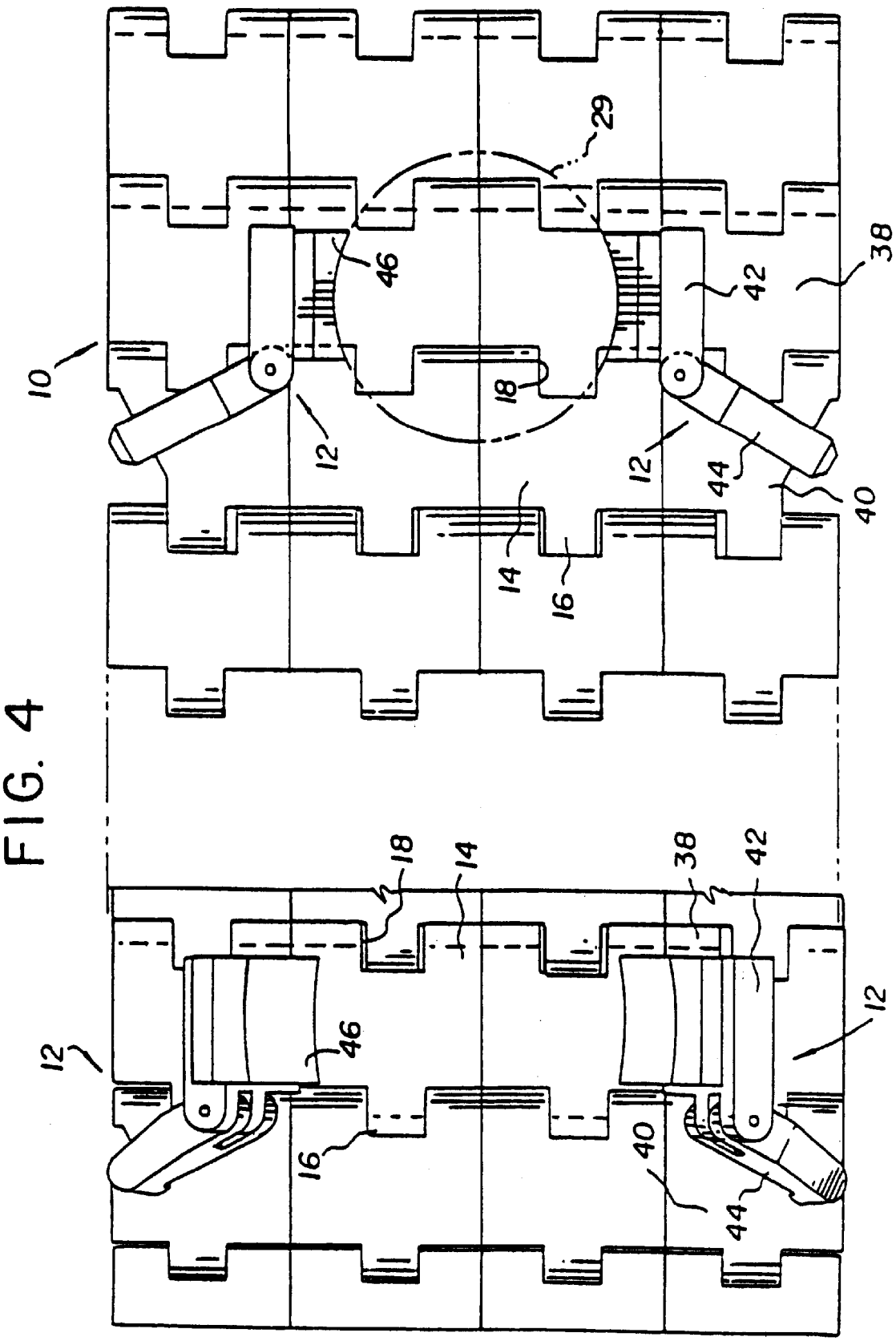
FIG. 4 is a partial top plan view of the conveyor illustrated in FIG. 1.

FIG. 3 of the drawings is an exploded view illustrating the component parts and construction of a typical clamping member 12 of the type disposed on the right side of the conveyor 10 shown in FIG. 2. It will be appreciated that the component parts and construction of the clamping member 12 disposed on the left side of the conveyor 10 of FIG. 2 are similar to, but of mirror-imaged relationship with the components of FIG. 3, whereby the clamping members 12 in each pair are oppositely acting, as hereinafter described, between a clamping position (shown rearwardmost in FIG. 2) and a release position (shown forwardmost in FIG. 2).

Thus, each clamping member 12 comprises a pivot base link 38 and an operator base link 40 which, besides being particularly configured for accommodating a pivot plate 42 and an operator plate 44 respectively, also contain a tongue 16 and a groove 18 to permit the links to be interconnected by connecting pin 20 and thereby integrated into the endless chain construction of the conveyor 10. The pivot base link 38 is adapted to pivotally mount the upstanding pivot plate 42 to which is attached a clamping pad 46 formed of resilient material and having a rigid base plate 47 that is attached to the pivot plate 42, as by means of bonding or by mechanical connectors. As shown, the pivot plate 42 contains a pair of depending projections or knuckles 48 which are received in cooperating grooves 50 formed on the inward transverse side of the pivot base link 38. A horizontally extending pivot pin 52 connects the pivot plate 42 to the pivot base link 38 whereby the former is able to move from a generally upstanding condition representing the clamping position to an angularly displaced condition representing the release position.

Angular movement of the pivot plate 42 is effected by the operator 44 that is connected at its inboard end to a side edge of the pivot plate via a vertically extending connecting pin 54 which extends through aligned holes 55 formed in interfitted projections and grooves on the facing side edges of the pivot plate 42 and operator plate 44, respectively. As shown in FIG. 3, the end of the hole in the uppermost projection is constricted at 55' in order to prevent dislodgement of the pin 54.

The end of the operator plate 44 opposite that which mounts connecting pin 54 is provided with a depending projection 56 that is adapted to extend vertically across the outboard side edge 58 of the operator base link 40 which is appropriately recessed at 60 to receive the projection and accommodate pivotal movement thereof. A pivot pin 62 extends from the side edge 58 of the operator base link 40 and is received in a hole in projection 56, the constricted end of which is shown at 64.

The relationship between the pivot base link 38, the operator base link 40, the pivot plate 42 and the operator plate 44 are such that, when the pivot base link and the operator base link are disposed substantially in co-planar side-by-side relation with respect to each other, the pivot plate, through the operation of the operator plate is caused to assume a vertical attitude. On the other hand, when the operator base link 40 is angularly deflected from its coplanar disposition with respect to the pivot base link 38, as for example, when the conveyor traverses sprocket 26 or 28, the operator plate 44 is caused to pivot with respect to the operator base link whereupon the pivot plate 42 is angularly displaced with respect thereto. In order to provided clearance for accommodating relative movement between the pivot plate 42 and the pivot base link 38, it is desirable to provide the facing edges of the respective parts with cooperating inclined surfaces 65 and 66, as shown in FIG. 3.

As indicated previously, the cooperating clamping member 12 in a pair of oppositely movable clamping members has component parts which conform in shape to those defining the above described clamping member, except that the pivot base link 38, the operator base link 40 and the pivot plate 42 are of opposite hand whereby the motion imparted to the pivot plate by the operator plate 44 is in opposition to the motion imposed upon the pivot plate 42 of the previously described clamping member so that the clamping members are caused to move either towards or away from each other, thus to cooperate with each other in the grasping or release of an article placed between them on the conveyor surface.

Alternatively, however, it should be understood that one of the clamping members may be simply fixed to an underlying conveyor link, thus serving as an anvil member for cooperative engagement by a transversely movable clamping member as previously described.

The operation of a conveyor apparatus utilizing clamping devices of the herein described invention is as follows. With particular reference to the conveyor organization 10 illustrated in FIG. 1 in which it is assumed that articles, such as for example, cylindrically formed containers 29 shown by phantom lines in FIG. 2, are to be conducted from a lower position at location A adjacent the lower sprocket 26 to an elevated position at location B adjacent the upper sprocket 28, one or both of the sprockets, depending upon the load capacity of the system, are driven to cause the endless chain conveyor 10 to be conducted in the direction of the arrows along a course, here shown as being substantially S-shaped, within guide structure (not shown) by the driving engagement of the boss-like projections 32 from the periphery of the sprockets 26, 28 with the recesses 34 on the underside of the respective links 14. At position A, articles, which may be deposited manually or from a magazine arrangement, or the like, are placed onto the surface of the conveyor 10 intermediate the transversely spaced rows of links that mount the opposed clamping members 12 of the respective pairs. Simultaneously with the deposition of the article 29 on the conveyor surface, the respective clamping members 12 in the illustrated arrangement are moved from the spread-apart, angularly displaced condition of their "release" position into an upright "clamping" position by the action of the operator plate 44 on the pivot plate 42 as, first, the pivot base link 38 and then the operator base link 40 traverse the sprocket 26. As shown in FIG. 2, as the clamping members 12 are brought into their "clamping" position, the resilient pads 46 on the respective clamping members engage opposite sides of the article 29 to effectively retain the article on the conveyor.

In the described embodiment of the invention, the operator plate 44 is advantageously disposed at about a 60° displacement with respect to the longitudinal axis of the conveyor. While such an organization results in an approximately 30° divergence of the pivot plates 42 as the links traverse the sprockets, it produces only a slight divergence or convergence of the clamping members 12 as the links traverse the larger radius bends indicated as C and D along the conveyor course in FIG. 1 whereby the relaxation of the retention grip of the pads 46 on the article 29 is not of sufficient extent to permit release of the article due to the resilience of the material forming the pads 46.

At position B, adjacent the upper sprocket 28, traversal of the sprocket 28 by the conveyor 10 creates an angular displacement of the pivot base link 38 with respect to the operator base link 40 which occurs in a reverse sequence from that which occurs as the conveyor transverses the lower sprocket 26. As a result, as the concerned links 38 and 40 are displaced from their level, co-planar disposition, the operator plates 44 act upon the respective pivot plates 42 of the paired clamping members 12 whereupon the clamping members are moved to their "release" position and the article 29 held between these members can by discharged by gravity into a receptacle or onto another conveyor, neither of which is shown in the drawing. As the conveyor 10 traverses further about the upper sprocket 28, the clamping members 12 are caused to resume their clamping position as they are moved along the underside of the conveyor to the lower sprocket 26 where the clamping members are first, spread apart to their "release" position upon traversing the lower portion of the sprocket and thereafter moved to their "clamping" condition, as hereinbefore described. Consequently, if desired, the clamping members 12 may in addition to, or alternatively thereof, operate to transport articles from an elevated location to a lower location.

Notwithstanding further that operation of the described apparatus involves clamping of an article 29 onto the conveyor 10 at position A adjacent sprocket 26 in FIG. 2 and the transfer of such article to position B adjacent sprocket 28, the present invention contemplates the disposition of one or more sprockets, which may be in the form of undriven idler sprockets of sufficiently small radius to effect fill pivotal movement of the respective clamping members 12 to their clamping or release positions, at any selected location or locations intermediate the drive sprockets whereupon articles can be grasped or discharged from the conveyor and, thereafter, other articles grasped prior to the respective pairs of clamping members reaching location B adjacent the upper sprocket 28.

In FIGS. 6 to 19 of the drawings there is shown an alternative embodiment of the invention in which the conveyor assembly, indicated generally by reference number 70, comprises a frame 72 which mounts, at opposite ends thereof, sprocket apparatus 74 and 76, each containing a pair of laterally spaced sprockets 78 that are appropriately journalled to the frame and keyed to, and interconnected by, axles 80 whereby the sprockets in each pair are rotated in unison. As shown in FIG. 8, the axle 80 connecting the sprockets 78 of the sprocket apparatus indicated as 74 is drivingly connected via a drive shaft 82 to a reversible drive motor 84. Alternatively, drive motors can be drivingly connected to both sprocket apparatus 74 and 76 when the loads on the conveyor assembly so require.

A pair of laterally spaced chain structures 86 extend between sprockets 78 on opposite sides of the frame 72. Each chain structure 86 consists of an endless chain having spaced rollers plates forming links 88 which are connected together in end-to-end relation by pins 90 that, as is well known, permit the links to pivot with respect to each other, particularly as the links traverse the respective sprockets.

Figure 12:
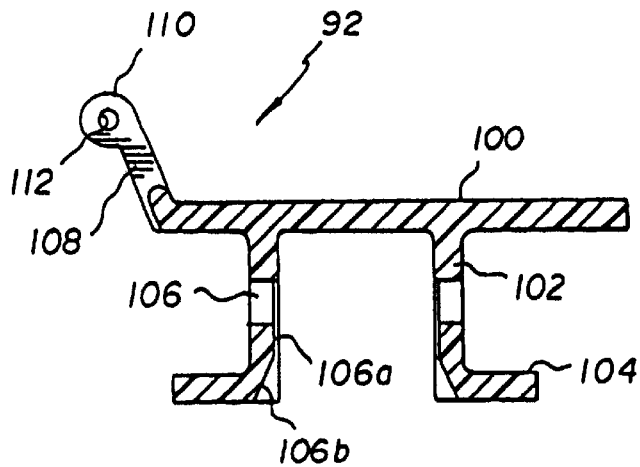
FIGS. 12, 13 and 14 are vertical section, end and bottom views, respectively, of a typical flight according to the invention.
Figure 13:
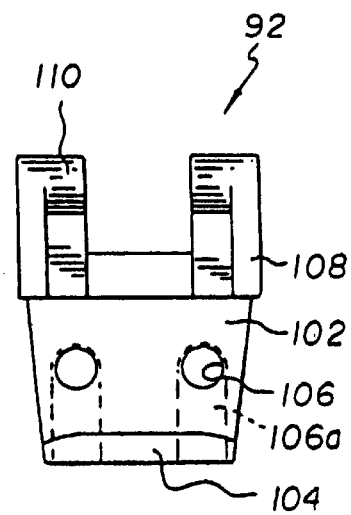
Figure 14:
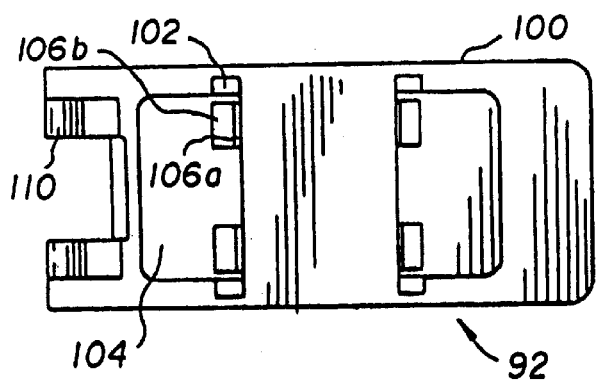

In this embodiment of the invention, as best shown in FIGS. 7 to 10, each chain structure 86 comprises a series of flights 92 which are designed to straddle an associated link 88 and be secured thereto by extensions of the respective link connecting pins 90, as hereinafter more fully described. The flights 92 are of three different types including spacer flights 94, pivot base flights 96 and operator base flights 98. Pivot base flights 96 and operator base flights 98, for ease of manufacture, are of identical structural configuration but are disposed in alternate traverse disposition along the respective chain structures 86. A typical such flight construction is shown in FIGS. 12 to 14 which represent a sectional elevational view, an end view, and a bottom view, respectively, of the construction. As shown, each of the flights 96 and 98 comprise a support surface 100 from which a pair of legs 102 depend. The legs 102 have oppositely extending feet 104 and contain a pair of aligned holes 106 that are adapted to receive the extended ends of the connecting pins 90 for securing the flights to the associated chain links 88. At one lateral end of the support surface 100 are a pair of spaced, laterally aligned struts 108 whose ends each contain an enlarged head 110 having aligned holes 112 for receiving a pin as hereinafter explained.

Desirably, the flights 94, 96 and 98 are formed of a durable plastic material such as acetals or polycarbonates, whereby the legs 102, while stiff, are somewhat resilient laterally with respect to the links 88 of the respective chain structures 86. To assist assembly of the flights onto the respective chain links 88, the inner surfaces of the legs 102 contain recessed slots 106a that extend from the bottoms of the feet 104 to the region around the holes 106 to permit passage of the ends of the connecting pins 90 to the holes. Also, the ends of the slots 106a may be formed with a tapered entry surface 106b by means of which the flight legs 102 are induced to spread by contact with the connecting pin extensions to assist in permitting the ends of the connecting pins 90 to reach the holes 106, thereby facilitating assembly of each flight onto an associated chain link 88 by simply aligning the connecting pins 90 with the slots 106a and pushing the flight onto the link whereupon the legs, due to their resiliency, will spread to permit passage of the pin ends and, thereafter, a return to their original orientation whereupon the flight 94, 96 or 98 will be securely locked in position on the associated link 88.

Figure 8:
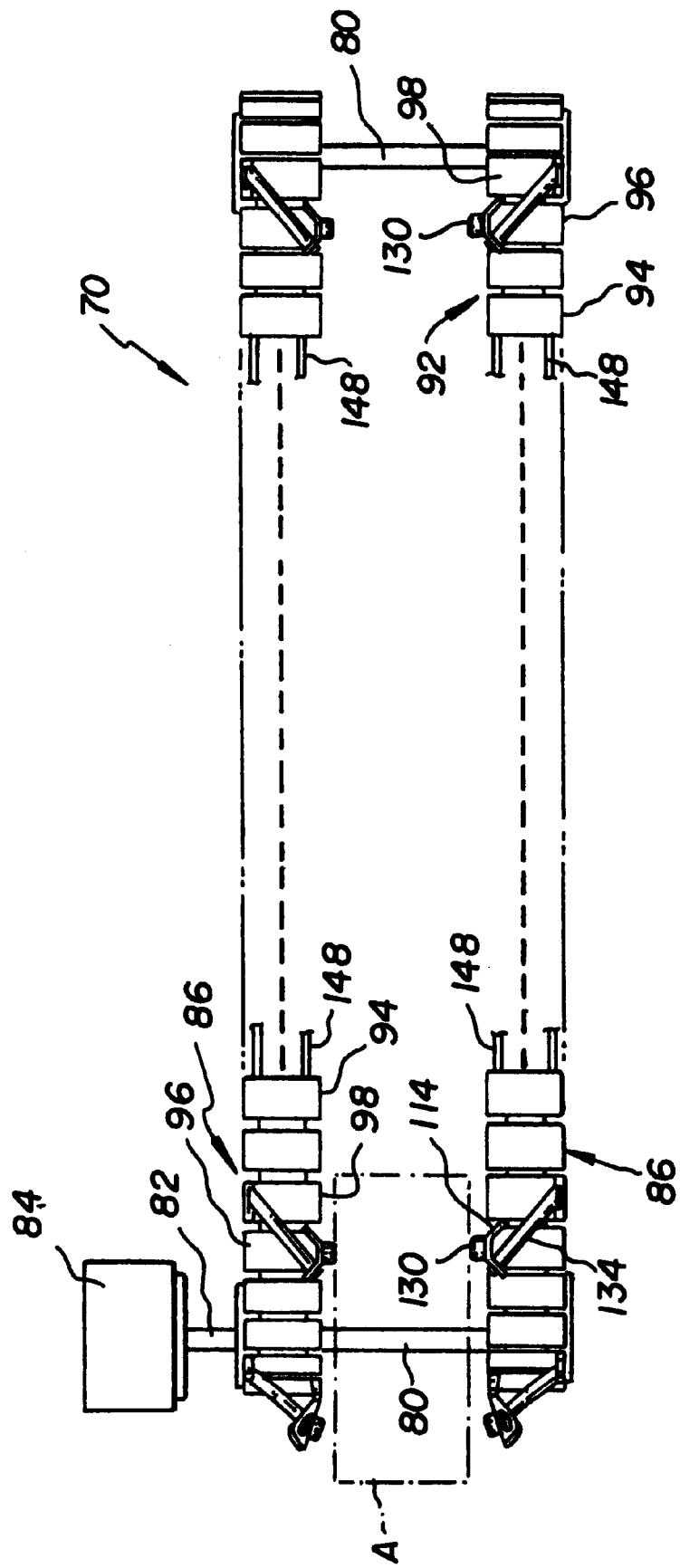
FIG. 8 is plan view of the endless conveyor embodiment of FIG. 6.
Figure 9:
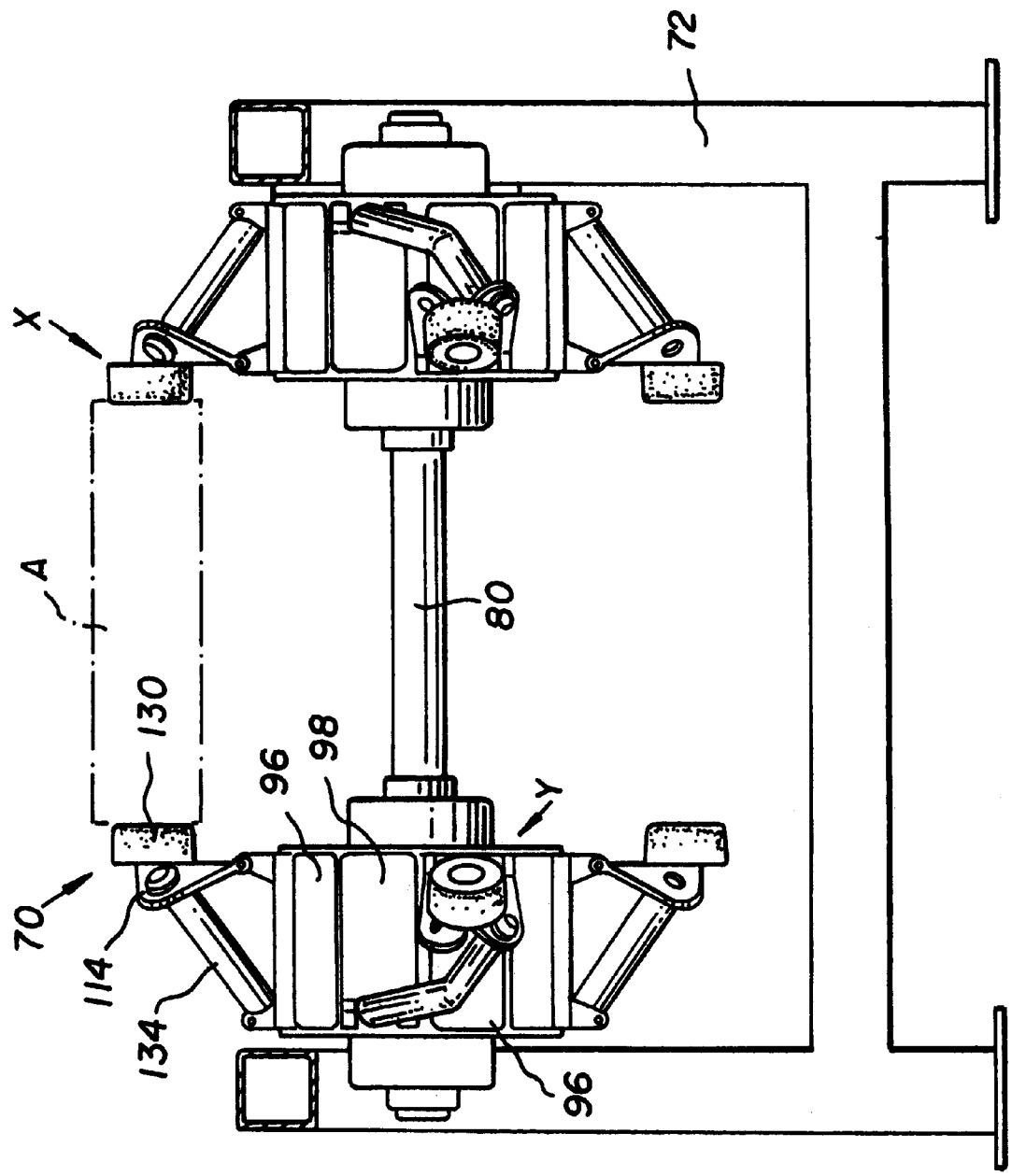
FIG. 9 is an enlarged end view of the endless conveyor embodiment of FIG. 6.

As shown in FIGS. 8 and 9, the flights constituting the pivot base flights 96 are installed on the chains with the aligned struts 108 innermost. Conversely, the flights constituting the operator base flights 98 are reversely oriented and have the struts disposed outermost. The struts 108 on the pivot base flights 96 are designed to receive a pivot plate 114, as shown in FIGS. 17 and 18. The pivot plate 114 at its bottom end contains a set of base elements including central element 116 and endmost elements 118, all of which contain holes 120 that are axially aligned for reception of a pivot pin 121 and that, as shown in FIG. 19, enables the pivot plate to be pin-connected between the struts 108 of the pivot base flights 96 for pivotal movement with respect to the support surface 100 of the associated flight.

The pivot plates 114 are provided with a central surface 124, which extends substantially perpendicularly with respect to the base elements 116 and 118 of the pivot plate, and a pair of oppositely spaced angularly displaced wings 126. A hole 128 extending through the central surface 124 is adapted to receive a connector (not shown) for attaching a clamping member 130 to the pivot plate. Each of the wings 126 are provided with enlarged openings 132, one of which is adapted to receive one end of an operator 134 as will be explained.

The operator base flights 98 have the same structural configurations as the pivot base flights 96 but are installed on the chain structures 86 adjacent, but in reverse orientation with respect to, the pivot base flights wherein the struts 108 with the operator base flights are disposed outermost. As a result of this construction an operator member 134 shown in FIG. 15, is caused to be connected at one end to the pivot plate 114 and has its other end attached to the struts 108 of the operator base plate 98 for operating the pivot plate and thereby the clamping member 130, as will be explained.

The operator member 134, which may be formed of a rubber-like resilient material, is connected to the pivot plate 114 by means of insertion of an end of the operator having a frusto-conical head 136 for insertion through an enlarged opening 132 in a wing 126 of the pivot plate. A necked-down recess 138 between the head 136 and the body of the operator member enables the concerned end of the operator member to be resiliently locked and thereby retained by the pivot plate.

Figure 11:
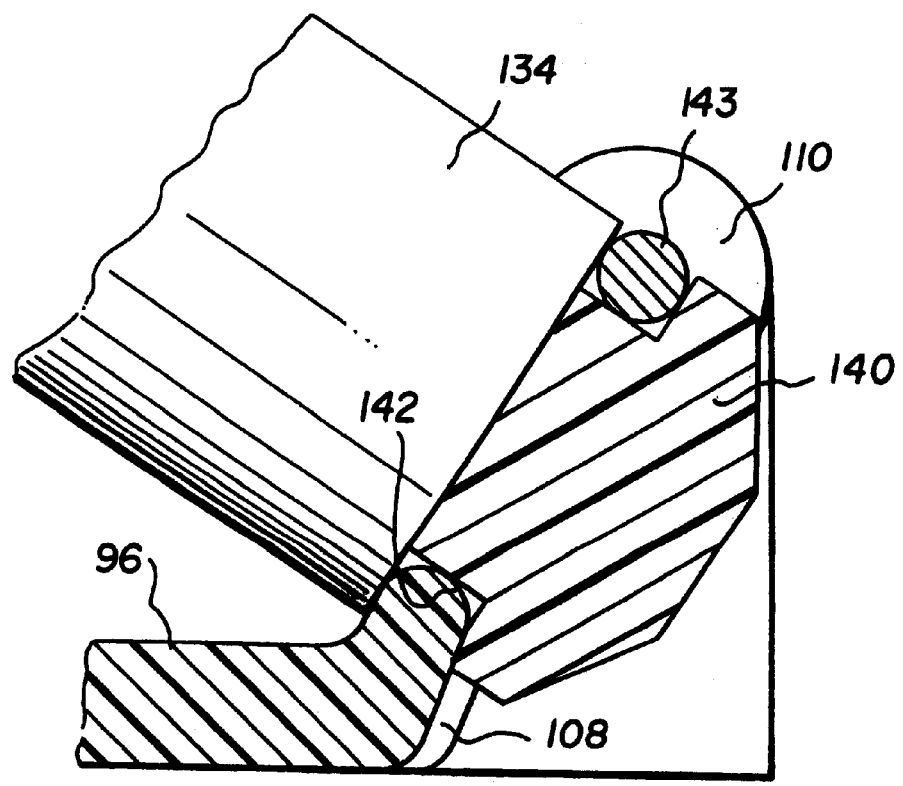
FIG. 11 is an enlarged view of the connection of the operator to its associated flight.

The other end of the operator member 134, as shown in FIGS. 11, 15 and 16, is formed as a chambered block 140 extending from the end of the body of the operator member 134. A recess 142 in the block 140 defines a receptor for a lock pin 143 which extends between, and is secured in, the aligned holes 112 of the struts 108 in the operator base plate 98 to securely fix the ends of the operator members 134 to the operator base flights 98.

Figure 10:
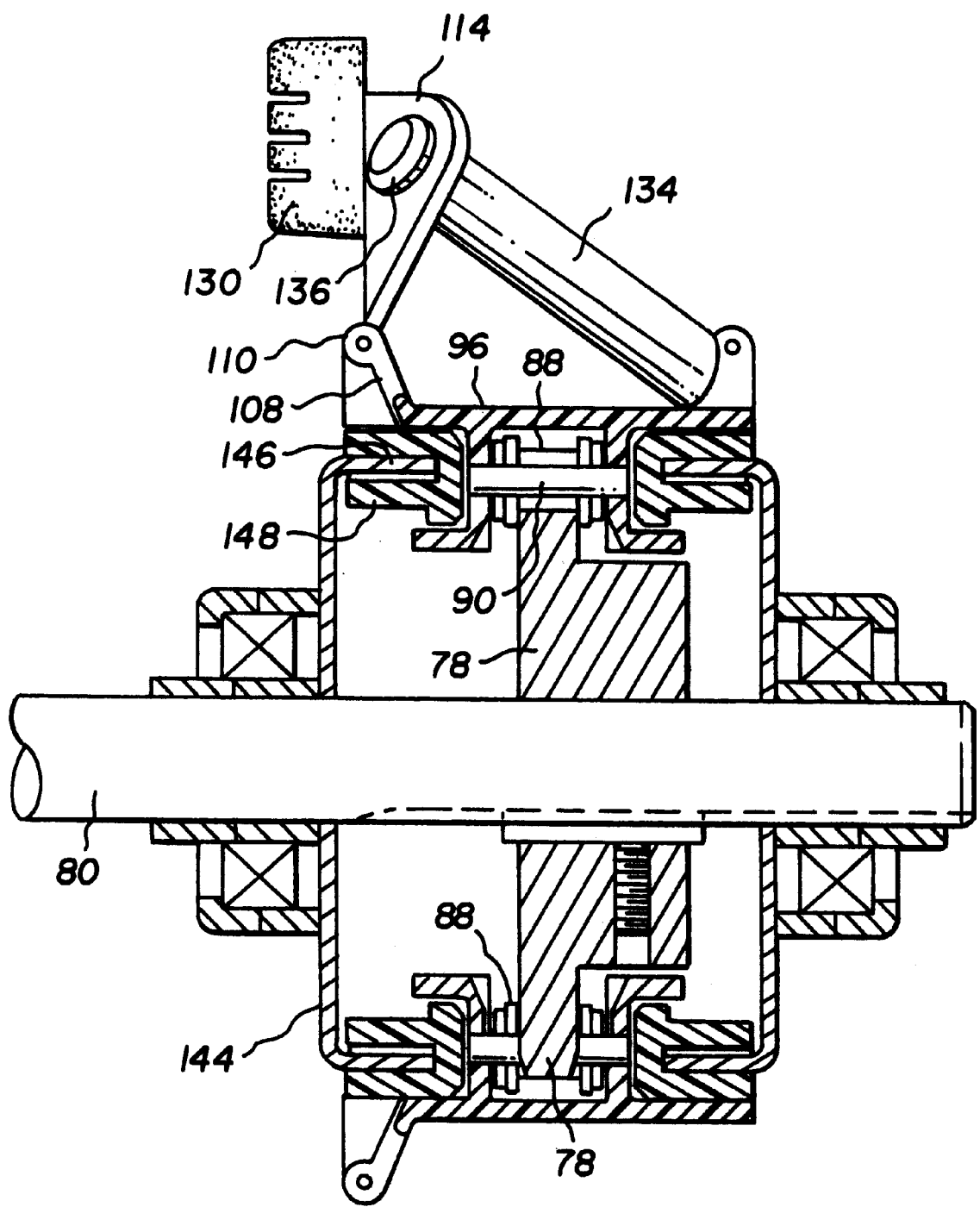
FIG. 10 is an enlarged partial sectional view taken along line 10—10 of FIG. 6.

Each chain structure 86 is covered on both its inward and outward sides by a metallic side rail 144 that is secured to the frame 72 and which extends from end-to-end of the chain structure, terminating at about the axes of the respective sprockets 78. The side rails 144, as shown in FIG. 10, are provided with inturned flanges 146 at their upper and lower sides. The flanges 146 engage guide strips 148 which are formed of a hard durable plastic material, or the like, and are C-shaped in cross-section to receive the respective flanges. As shown, the guide strips 148 are dimensioned to be loosely received in the respective flights, in spaces defined by the facing sides of the support surface 100, legs 102 and feet 104 on opposite sides of the chain structure 86. Thus, each chain structure 86 is effectively vertically supported along its length and its movement relative to the frame 72 effectively guided.

Figure 6:
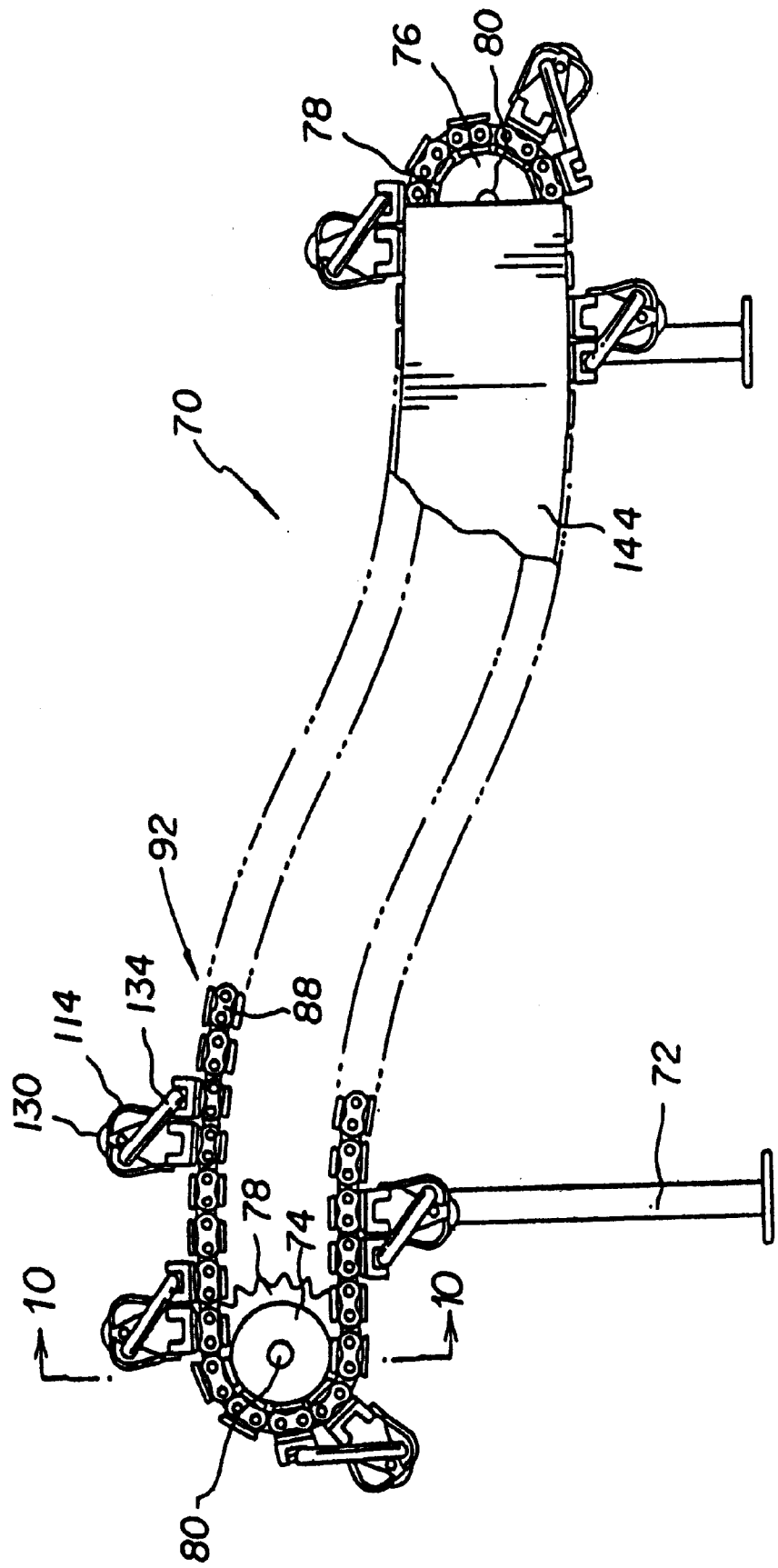
FIG. 6 is a side elevational view, with parts removed, of another embodiment of endless conveyor having clamping members according to the invention.
Figure 7:
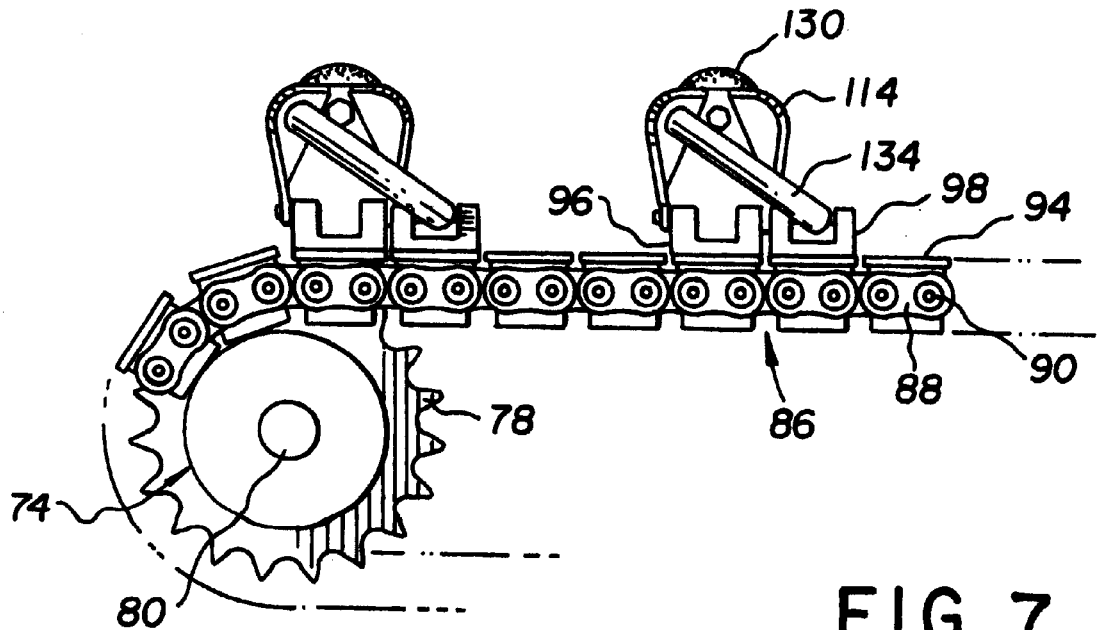
FIG. 7 is a partial elevational view showing a portion of the endless conveyor embodiment of FIG. 6 in greater detail.

From a consideration of FIGS. 6 to 8 it can be seen that the sequence of flights in the described installation comprise, in series, a pair of spacer flights 94, a pivot base flight 96, and an operator base flight 98. While the number of spacer flights 94 may vary depending upon the selected spacing between clamping members as dictated by the size of the articles to be conveyed or the utility to which the apparatus is to serve, in a typical conveyor apparatus installation each pivot base flight 96 will be immediately followed by an operator base flight 98 with the spacing between clamping members determined by the number of spacer flights employed. The invention, however, contemplates arrangement of the flights in any sequence which will produce the mode of operation described herein.

The operation of the described alternative embodiment of the invention conforms essentially to that of the earlier described embodiment in that the relationship between the pivot base flight 96, the operator base flight 98, the pivot plate 114 and the operator member 134 is such that, when the flights are disposed in substantial co-planar relation with respect to each other, the pivot plate, through the operation of the operator member, is caused to assume a vertical attitude wherein each pair of oppositely spaced clamping members 130 is disposed in its clamping position, as shown at X in FIG. 9, for securing an article A to be engaged. However, when the pivot base flights 96 are angularly deflected with respect to the adjacent operator base flights 98, as for example, when the chain structures 86 traverse the respective sprockets 78, the pivot base flights are angularly deflected with respect to the operator base flights whereupon the operator members 134 cause the pivot plates 114 to move laterally outwardly into their release position, as shown at Y in the drawing figure. When the flights are returned to their co-planar orientation in traversing the underside of the chain structures the pivot plates and the clamping members are returned to their clamping position, as shown in FIG. 9.

Notwithstanding the described arrangement in which articles A are retained as the flights traverse the top side of the chain structures 86, it will be appreciated that articles may, alternatively, be grasped as the flights traverse the underside of the chain structures or, if desired, while the flights traverse both the top side and the underside of the chain structures. Also, through the use of a reversing drive motor 84 for driving one or both sprockets 78, the chain structures 86 can be moved in opposite directions, as desired.

It will thus be appreciated from the foregoing that the present invention provides an improved conveyor organization which is effective, yet economical to fabricate and to operate. The described apparatus is versatile in its application in that simply by adjustment of the clamping pad configuration, articles of diverse shapes and sizes can be accommodated by the system. On the other hand, by the imposition of additional idler sprockets, or the like, the receipt and/or discharge of articles at various preselected locations between the drive sprockets can readily be achieved.

Accordingly, from the foregoing it should be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A conveyor assembly, comprising:
   an endless chain structure including longitudinally spaced, articulating links;
   means for driving said chain structure along a continuous path of movement; oppositely spaced clamping members carried by said chain structure and movably connected to links thereof to be relatively displaceable with respect to each other between a clamping position in which said clamping members are effective to grippingly secure an article to the chain structure and a release position in which said clamping members release the secured article from the chain structure;
   an actuating mechanism operative to move each said at least one clamping member, said actuating mechanism including an actuating member connected at one end to said clamping member and at the other end to a link other than the link connecting said clamping member, whereby said actuating member induces movement in said clamping member in response to relative angular displacement between said link connecting said clamping member and that connecting said other end of said actuating member; and
   means for displacing said links of said chain structure from its selected course of movement.

2. A conveyor assembly according to claim 1 in which said at least one clamping member includes a pivot plate pivotally connected to a pivot base link of said chain structure, and said actuating member is an operator plate pivotally connected between said pivot plate and an operator base link of said chain structure to effect angular displacement of said pivot plate between a clamping position and a release position upon relative displacement of the operator base link and the pivot base link of said chain structure from a selected path of movement.

3. A conveyor assembly according to claim 2 including a gripper pad formed of resilient material carried by said pivot plate.

4. A conveyor assembly according to claim 2 in which said pivot plate is pin connected to said pivot base link and said operator plate is pin connected at one end to said pivot plate and at another end to said operator base link sequentially positioned adjacent said pivot base link in said chain structure.

5. A conveyor assembly according to claim 2 in which said pivot plate is positioned in laterally spaced arrangement with respect to the connection of said operator plate to said operator base link whereby displacement of said operator base link from a level path of movement imparts a force on said pivot plate effective to move it angularly with respect to said pivot base link.

6. A conveyor assembly according to any one of claims 1 to 5 in which said means for driving said chain structure along a continuous path of moment and said means for displacing said chain structure from a level course of movement comprises sprocket means engaging said chain structure.

7. A conveyor assembly according to claim 6 in which said clamping members are arranged in pairs, and in which the clamping members of each pair are mutually oppositely movable with respect to each other between a clamping position and a release position.

8. A conveyor assembly, comprising:
   an endless chain structure including a plurality of laterally spaced rows of longitudinally spaced articulating links;
   means for moving said laterally spaced rows of links continuously in a selected direction, said chain structure, in at least one row of links, containing a clamping member disposed in laterally spaced, opposed relation with respect to a cooperating clamping member in a laterally spaced row of links, and said opposed clamping members being relatively oppositely displaceable between a clamping position in which said opposed clamping members grippingly secure an article to said chain structure and a release position in which said opposed clamping members release the secured article from the chain structure;
   means forming an actuating mechanism associated with at least one of said clamping members, said actuating mechanism including a pivot plate pivotally connected to a link of said chain structure forming a pivot base link for transverse pivotal movement with respect to the direction of movement of said chain structure, and an operator member connected between said pivot plate and an operator base link of said chain structure, said operator member being effective to displace said pivot plate with respect to said pivot base link between a clamping position and a release position upon displacement of said chain structure from a level path of movement; and
   means for mutually angularly displacing said articulating pivot base link and said operator base link of said chain structure.

9. A conveyor assembly according to claim 8 including a gripper pad formed of resilient material carried by said pivot plate.

10. A conveyor assembly according to claim 8 in which said pivot plate is pin-connected to said pivot base link and said operator member is an operator plate pin-connected at one end to said pivot plate and at another end to said operator base link sequentially positioned adjacent said pivot base link in said chain structure.

11. A conveyor assembly according to claim 10 in which said pivot plate is positioned in laterally spaced arrangement with respect to the connection of said operator plate to said operator base link whereby angular displacement of said operator base link from a path of movement imparts a force on said pivot plate to move said pivot plate angularly with respect to said pivot base link.

12. A conveyor assembly according to any one of claims 8 to 11 in which said means for driving said chain structure along a continuous path of movement and said means for displacing said chain structure from a level path of movement comprises sprocket means engaging said chain structure.

13. A conveyor assembly according to claim 12 in which said clamping members are arranged in pairs which are mutually oppositely movable with respect to each other between a clamping position and a release position.

14. A conveyor assembly comprising:
an endless chain structure including a pair of opposed, transversely spaced chains containing interconnected, articulating roller links,
a plurality of flights attached to said chain in side-by-side relation to be carried thereby,
a pivot plate connected to selected flights for pivotal movement transversely of the direction of movement of said chain,
a clamping member fixed to said pivot plate and being operative to secure an article when displaced transversely by said pivot plate,
an operator member having one end connected to a flight adjacent said selected flight and its other end connected to said pivot plate,
a plurality of longitudinally spaced sprockets driving said chain and about which said flights angularly deflect with respect to each other as said links traverse said sprockets,
said operating member being operative to pivotally urge said pivot plate transversely of said chain structure as said flights angularly deflect as they traverse said sprockets, whereby said clamping members are moved to their clamping position or to their release position in response to the direction of relative deflection of said links.

15. A conveyor assembly according to claim 14 in which each of said flights is attached to said links by means of pins interconnecting said roller links.

16. A conveyor assembly according to claim 14 in which said operator member is a resilient rod.

17. A conveyor assembly according to claim 16 in which said operator member contains a shouldered head at each end for connection to said pivot plate on said one flight and to said adjacent flight.

18. A conveyor assembly according to claim 14 including means for guiding said flights along a course extending between and around said sprockets.

19. A conveyor assembly according to claim 18 in which said flight guiding means comprises a frame, oppositely spaced guide sleeves carried by said frame, said guide sleeves defining a space therebetween for passage of said roller links and said flights.

20. A conveyor assembly according to claim 19 in which each said flight contains a support surface, connector elements depending from said support surface and being mutually spaced to receive a chain link, and holes in said connector elements receiving roller pins of said chain links for affixing said flight to said chain link.

21. A conveyor assembly according to claim 20 in which said flights include a support member upstanding from the support surface thereof, selected ones of said support members being adapted to support said pivot plate for transverse pivoted movement with respect to the direction of movement of said chain and selected other ones of said support members being adapted to connect an end of said operator member.

22. A conveyor assembly according to claim 21 in which pivot base flights and said operator base said flights are identically formed.

23. A conveyor assembly according to claim 22 in which said support member extends upwardly from a lateral end of the support surface thereof and in which flights carrying said pivot plate have said support member disposed on an inboard side of said assembly and flights securing an end of an operating rod have said support member disposed on an outboard side of said assembly.

24. A conveyor assembly, comprising:
a frame defining a longitudinally extending conveying course;
pairs of transversely spaced sprockets mounted on an opposite ends of said frame for rotation and disposed on opposite sides of said conveying course;
means for driving at least one of said pairs of sprockets;
an endless chain containing interconnected, articulating links operatively disposed on each opposite side of said conveying course and being driven along said course by sprockets disposed at opposite ends of said course;
a plurality of flights attached to each of said chains in side-by-side relation to be carried thereby;
a pivot plate connected to oppositely spaced selected flights carried by each of said chains for opposed pivotal movement with respect to each other;
a clamping member fixed to each pivot plate and operative to secure an article when said pivot plates converge toward each other and to release said article when said pivot plates diverge away from each other;
each of said pivot plates having an operator member having one end thereof connected to a flight adjacent a selected flight and its other end connected to a pivot plate, said operating members being operative to pivotally urge said pivot plates transversely of said chain structure as said flights angularly deflect with respect to each other as they traverse said sprockets, whereby opposed clamping members mutually converge to an article securing position and diverge to an article releasing position in response to the direction of relative deflection of said flights.

25. A conveyor assembly according to claim 24 in which each of said flights is attached to said links by means of pins interconnecting said links.

26. A conveyor assembly according to claim 24 in which said operator members are resilient rods.

27. A conveyor assembly according to claim 26 in which said operator members each contain a shouldered head at each end for connection to said pivot plate on said selected flight and to said adjacent flight.

28. A conveyor assembly according to claim 24 including means carried by said frame on opposite sides of each of said chains for guiding said flights along a course extending between and around said sprockets.

29. A conveyor assembly according to claim 28 in which each said flight guiding means comprises oppositely spaced guide sleeves, said guide sleeves defining a space therebetween for passage of said roller links and said flights of the respective chains.

* * * * *